(12) United States Patent
Yang et al.

(10) Patent No.: US 9,891,481 B2
(45) Date of Patent: Feb. 13, 2018

(54) DISPLAY SUBSTRATE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Ming Yang, Beijing (CN); Xue Dong, Beijing (CN); Renwei Guo, Beijing (CN); Lei Ma, Beijing (CN); Wenqing Zhao, Beijing (CN)

(73) Assignees: BOE Technology Group Co., Ltd., Beijing (CN); Beijing BOE Optoelectrics Technology Co., Ltd., Beijing (CN)

( * ) Notice: Subject to any disclaimer, the term of this patent is extended or adjusted under 35 U.S.C. 154(b) by 0 days.

(21) Appl. No.: 14/914,483

(22) PCT Filed: Aug. 13, 2015

(86) PCT No.: PCT/CN2015/086811
§ 371 (c)(1),
(2) Date: Feb. 25, 2016

(87) PCT Pub. No.: WO2016/123953
PCT Pub. Date: Aug. 11, 2016

(65) Prior Publication Data
US 2016/0357070 A1    Dec. 8, 2016

(30) Foreign Application Priority Data

Feb. 6, 2015    (CN) .......................... 2015 1 0065369

(51) Int. Cl.
H01L 29/20    (2006.01)
H01L 33/00    (2010.01)
(Continued)

(52) U.S. Cl.
CPC ...... *G02F 1/134309* (2013.01); *G02F 1/1368* (2013.01); *G02F 1/136209* (2013.01);
(Continued)

(58) Field of Classification Search
CPC ................................................. G02F 1/134309
(Continued)

(56) References Cited

U.S. PATENT DOCUMENTS 8,274,464 B2    9/2012 Asako et al.
2005/0140893 A1    6/2005 Hong
(Continued)

FOREIGN PATENT DOCUMENTS

CN    101821791 A    9/2010
CN    102629056 A    8/2012
(Continued)

OTHER PUBLICATIONS

Chinese Office Action in Chinese Application No. 201510065369.5, dated Dec. 29, 2016 with English translation.
(Continued)

*Primary Examiner* — Matthew Landau
*Assistant Examiner* — Igwe U Anya
(74) *Attorney, Agent, or Firm* — Collard & Roe, P.C.

(57) ABSTRACT

The present disclosure provides a display substrate and a display device, which display substrate including a base substrate a plurality rows of subpixel units formed on the base substrate. Each of the subpixel units is of a parallelogram shape including first sides parallel to the row direction and second sides inclined with respect to vertical direction, wherein the vertical direction is perpendicular to the row direction, second sides of subpixel units in the same row have consistent incline direction, and second sides of subpixel units in adjacent two rows have opposite incline directions. With the display substrate provided in the present
(Continued)

disclosure, a display mode of two-pixels-two-domains pixel structure may be implemented by designing subpixel units in the display substrate as parallelograms and making subpixel units in adjacent two rows to have opposite incline directions, which allows to effectively increase viewing angle and reduce color shift while the display substrate is used for virtual display.

16 Claims, 3 Drawing Sheets

(51) Int. Cl.
  *G02F 1/1343* (2006.01)
  *G02F 1/1368* (2006.01)
  *G02F 1/1362* (2006.01)

(52) U.S. Cl.
  CPC ............ *G02F 1/136286* (2013.01); *G02F 2001/134345* (2013.01); *G02F 2001/136222* (2013.01)

(58) Field of Classification Search
  USPC ............................................. 257/89
  See application file for complete search history.

(56) References Cited

U.S. PATENT DOCUMENTS

| | | | | |
|---|---|---|---|---|
| 2010/0245223 | A1* | 9/2010 | Asako | G02F 1/136286 345/92 |
| 2012/0105786 | A1* | 5/2012 | Iwamoto | G02F 1/13378 349/139 |
| 2012/0229456 | A1* | 9/2012 | Takahashi | H04N 13/0404 345/419 |
| 2013/0120680 | A1* | 5/2013 | Sun | G02F 1/1368 349/43 |
| 2013/0176523 | A1 | 7/2013 | Chen et al. | |
| 2014/0177008 | A1* | 6/2014 | Raymond | B42D 25/324 358/3.28 |
| 2015/0035872 | A1* | 2/2015 | Shima | H04N 13/0404 345/690 |
| 2015/0138473 | A1 | 5/2015 | Zhang | |
| 2015/0160463 | A1* | 6/2015 | Niu | G02B 27/2214 349/15 |
| 2015/0338708 | A1 | 11/2015 | Li et al. | |

FOREIGN PATENT DOCUMENTS

| | | |
|---|---|---|
| CN | 102854675 A | 1/2013 |
| CN | 103018980 A | 4/2013 |
| CN | 103926698 A | 7/2014 |
| CN | 103926715 A | 7/2014 |
| CN | 104597675 A | 5/2015 |
| CN | 104614909 A | 5/2015 |
| KR | 10-2002-0017314 A | 3/2002 |
| KR | 10-2005-0112630 A | 12/2005 |

OTHER PUBLICATIONS

International Search Report of PCT/CN2015/086811 in Chinese, dated Oct. 29, 2015 with English translation.

Notice of Transmittal of the International Search Report of PCT/CN2015/086811 in Chinese, dated Oct. 29, 2015.

Written Opinion of the International Searching Authority of PCT/CN2015/086811 in Chinese, dated Oct. 29, 2015 with English translation.

Second Chinese Office Action in Chinese Application No. 201510065369.5, dated Aug. 10, 2017 with English translation.

* cited by examiner

DISPLAY SUBSTRATE AND DISPLAY DEVICE

CROSS REFERENCE TO RELATED APPLICATIONS

This application is the National Stage of PCT/CN2015/086811 filed on Aug. 13, 2015, which claims priority under 35 U.S.C. § 119 of Chinese Application No. 201510065369.5 filed on Feb. 6, 2015, the disclosure of which is incorporated by reference.

FIELD OF THE INVENTION

Embodiments of the present invention relate to a display substrate and a display device.

BACKGROUND

In recent years, with the improvement of resolution of display products, pixel density has been increased gradually, the manufacturing processes for panels are becoming more and more complex and production costs have increased. Virtual display products have display effects approaching real resolution products by add-on algorithm or signal processing while reducing data lines, thereby drastically simplifying manufacturing processes for panels and reducing production costs. In traditional virtual display products in which pixel structures mostly adopt one domain design, pixels in products are identical in terms of shape, size and arrangement such that liquid crystal in subpixels of the same color under a certain gray scale has the same alignment direction, which in turn results in a small viewing angle for this design and obvious color shift phenomenon.

SUMMARY

The present disclosure provides a display substrate and a display device that can improve viewing angle and color shift phenomena of prior art virtual display products.

The technical proposal of the present disclosure provides a display substrate including a base substrate and a plurality rows of subpixel units formed on the base substrate. Each of the subpixel units is of a parallelogram shape including two first sides parallel to the row direction and two second sides inclined with respect to vertical direction, wherein the vertical direction is perpendicular to the row direction, second sides of all subpixel units in the same row have consistent incline direction, and second sides of subpixel units in adjacent two rows have opposite incline directions from each other.

Second sides of subpixel units in adjacent two rows have identical absolute values of incline angles and have opposite incline directions with respect to said vertical direction.

Subpixel units in any row are misaligned with subpixel units in an adjacent row of said any row.

For any subpixel unit, a distance from its geometric center to a geometric center of each adjacent subpixel unit in the vertical direction is identical.

For each subpixel unit, a ratio of its height in the vertical direction to a length of its first side is 3:3~3:1.

For each subpixel unit, an incline angle of a second side with respect to said vertical direction is 1~45 degree.

The present disclosure further provides a display device including the above-mentioned display substrate.

With the display substrate provided in the present disclosure, a display mode of two-pixels-two-domains pixel structure may be implemented by designing subpixel units in the display substrate as parallelograms and making subpixel units in adjacent two rows to have opposite incline directions. Since subpixel units in the entire display substrate are divided into two parts according to different incline directions, and it is in turn possible to enable liquid crystal in subpixel units of the same color to be classified into two directions under a certain gray scale, viewing angle is effectively increased and color shift is reduced when the display substrate is used for virtual display.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION OF EMBODIMENTS

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Implementations of the present invention provide a display substrate including a base substrate and a plurality rows of subpixel units formed on the base substrate. Each of the subpixel units is of a parallelogram shape including two first sides parallel to the row direction and two second sides inclined with respect to vertical direction, wherein the vertical direction is perpendicular to the row direction, the second sides of all subpixel units in the same row have consistent incline direction, and the second sides of subpixel units in adjacent two rows have opposite incline directions from each other.

With the display substrate provided in implementations of the present invention, a display mode of two-pixels-two-domains pixel structure may be implemented by designing subpixel units in the display substrate as parallelograms and making subpixel units in adjacent two rows to have opposite incline directions. Since subpixel units in the entire display substrate are classified into two parts with different incline directions and liquid crystals in subpixels of the same color are in turn classified into two directions under a certain gray scale, viewing angle is increased and color shift is reduced when the display substrate is used for virtual display.

Figure 1:
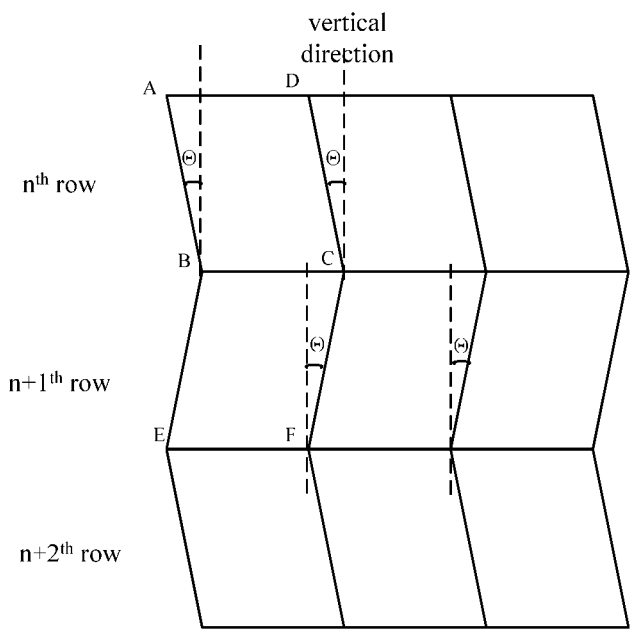
FIG. 1 is a diagram of a display substrate provided in an implementation of the present invention.

Referring to FIG. 1, which is a diagram of a display substrate provided in an implementation of the present invention, including a base substrate (not shown) and a plurality rows ( . . . $n^{th}$ row, $n+1^{th}$ row, $n+2^{th}$ row, . . . ) of subpixel units arranged in an array formed on the base substrate. Each of the subpixel units is of a parallelogram shape, and each parallelogram shape includes two first sides parallel to the row direction and two second sides inclined with respect to vertical direction, wherein shape and size of those subpixel units in the same row are identical with each other, the second sides of those subpixel units in the same row have consistent incline direction with respect to the vertical direction, and the second sides of subpixel units in adjacent two rows have opposite incline directions from each other. For example, as shown in FIG. 1, for the subpixel units in the $n^{th}$ row, their second sides BA are inclined to the left with respect to the vertical line starting from point B, while for the subpixel units in the $n+1^{th}$ row, their second sides FC are inclined to the right with respect to the vertical line starting from point F, thereby realizing two domain pixel structure on the display substrate which can effectively improve viewing angle and reduce color shift.

Preferably, second sides of subpixel units in adjacent two rows have the same incline angle with respect to the vertical direction, that is, all the subpixel units in the display substrate have the same incline angle, allowing subpixel units in any two adjacent rows are disposed symmetrically and thus to improve the uniformity of display color. As shown in FIG. 1, the incline angle θ of the second side of each subpixel unit may be between 1~45 degree, e.g., 10, 20, 30, 40 degree etc.

Figure 2:
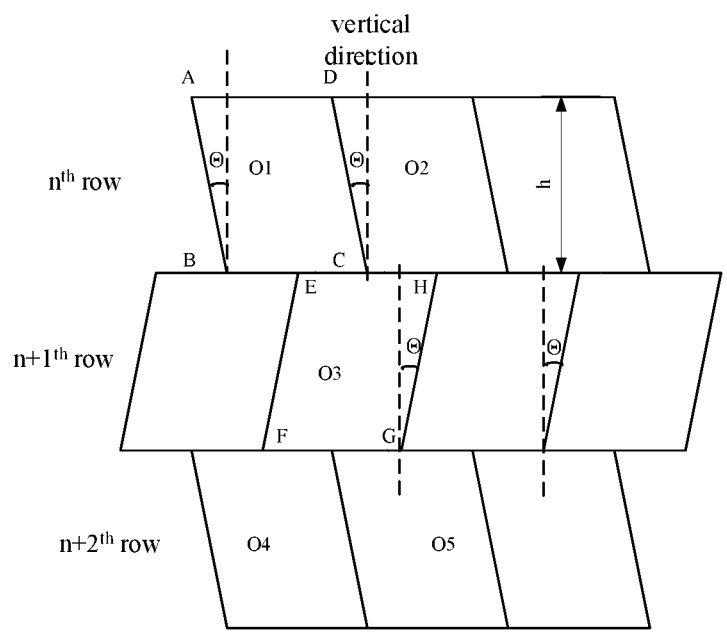
FIG. 2 is a diagram of another display substrate provided in an implementation of the present invention.

Referring to FIG. 2, which is a diagram of a display substrate provided in an implementation of the present invention, including a base substrate and a plurality rows ( . . . $n^{th}$ row, $n+1^{th}$ row, $n+2^{th}$ row, . . . ) of subpixel units formed on the base substrate, wherein subpixel units in any row are misaligned with subpixel units in a row adjacent to this row, each of the subpixel units is of a parallelogram shape, each parallelogram shape including first sides parallel to the row direction and second sides inclined with respect to vertical direction. In the display substrate, second sides of all subpixel units have the same incline angle with respect to the vertical direction, while second sides of subpixel units in two adjacent rows have opposite incline angles from each other.

Specifically, as shown in FIG. 2, all subpixel units have the same size. By misaligning subpixel units in each row with subpixel units in an adjacent row, that is, arranging three subpixel units adjacent to each other in two adjacent rows as a triangle, it is further possible to increase dispersion degree of subpixel units and allow more uniform distribution of colors in the virtual space when the array substrate is used for virtual display.

Preferably, in order to further improve the uniformity of color display of the display substrate, for any subpixel unit, the distance from its geometric center to the geometric center of each adjacent subpixel unit in vertical direction is identical, that is, for any subpixel unit, any two subpixel units adjacent to it in the column direction can be disposed symmetrically with respect to it. For example, as shown in FIG. 2, for the subpixel unit EFGH in the $n+1^{th}$ row, its adjacent subpixel units in vertical direction include two subpixel units with geometric centers O1 and O2 respectively in the $n^{th}$ row and and two subpixel units with geometric centers O4 and O5 respectively in the $n+2^{th}$ row. In order to improve the uniformity of color display of the display substrate, distances from O3 to O1, O2, O4 and O5 may be set equal. Specifically, when the first length of each subpixel unit in the display substrate is 2a, as shown in FIG. 2, the distance from vertice E to vertice B may be set as a.

The display substrate provided in implementations of the present invention may be used for virtual display. The ratio of height to length of the first side of each subpixel unit in vertical direction may be 3:3~3:1, e.g., 3:2 and etc. For example, for a subpixel unit in a traditional structure, its height in vertical direction is 3a, and its width in the row direction is a. When the display substrate in the present disclosure is used for virtual display, the width of the subpixel unit in the row direction, i.e., the length of the first side, is increased. For example, its height h in vertical direction may be set as 3a, while the first side length may be increased to 2a or 3a, thereby reducing the number of signal lines in the display substrate.

Figure 3:
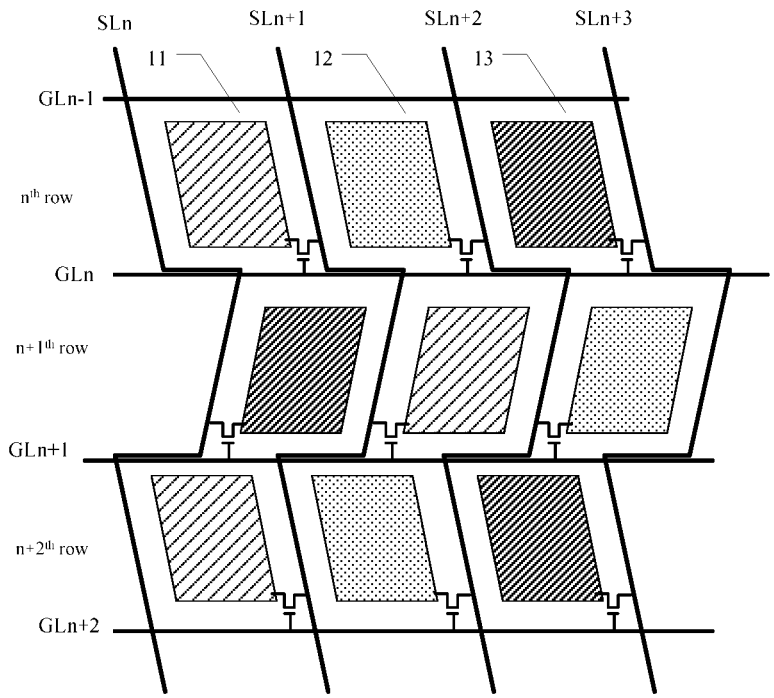
FIG. 3 is a diagram of an array substrate provided in an implementation of the present invention.

The above-mentioned display substrate may be an array substrate (TFT substrate). Referring to FIG. 3, which is a diagram of an array substrate provided in an implementation of the present invention including a base substrate provided with a plurality of gate lines ( . . . GLn−1, GLn, GLn+1, GLn+2 . . . ) and a plurality of data lines ( . . . SLn, SLn+1, SLn+2, SLn+3 . . . ) intersecting with each other to define a number of subpixel units, wherein each gate line is disposed horizontally and each data line is disposed inclined with respect to the vertical direction such that subpixel units in adjacent two rows have different incline directions, and at the same time, each data line further zigzags in the horizontal direction such that subpixel units in one row are misaligned with subpixel units in the adjacent row.

The above-mentioned array substrate may include subpixel units of three colors, that is, subpixel units 11 of the first color, subpixel units 12 of the second color and subpixel units 13 of the third color respectively, and subpixel units of the first, second and third color are arranged periodically in each row and each subpixel unit has a different color from that of adjacent subpixel units such that any three subpixel units arranged in a triangle may form a pixel unit, wherein the first, second and third color may be any one of red (R), green (G) and blue (B) respectively. For example, the first color may be red (R), the second color may be green (G) and the third color may be blue (B). Specifically, for the array substrate shown in FIG. 3, if three subpixel units in the $n^{th}$ row in an image are red, green and blue respectively from left to right, then the three subpixel units in the $n+1^{th}$ row are blue, red, green respectively from left to right, and the three subpixel units in the $n+2^{th}$ row are red, green and blue respectively from left to right.

In the array substrate provided in the present implementation, the order in which subpixel units of various colors are arranged in one row is not limited by the specific exemplary implementation. However, when the arrangement order of subpixel units in any row is determined, since any one subpixel unit in a row adjacent to this row has different color from that of the two adjacent two subpixel units, it is also possible to determine the arrangement order for subpixel units of various colors in other rows.

Figure 4:
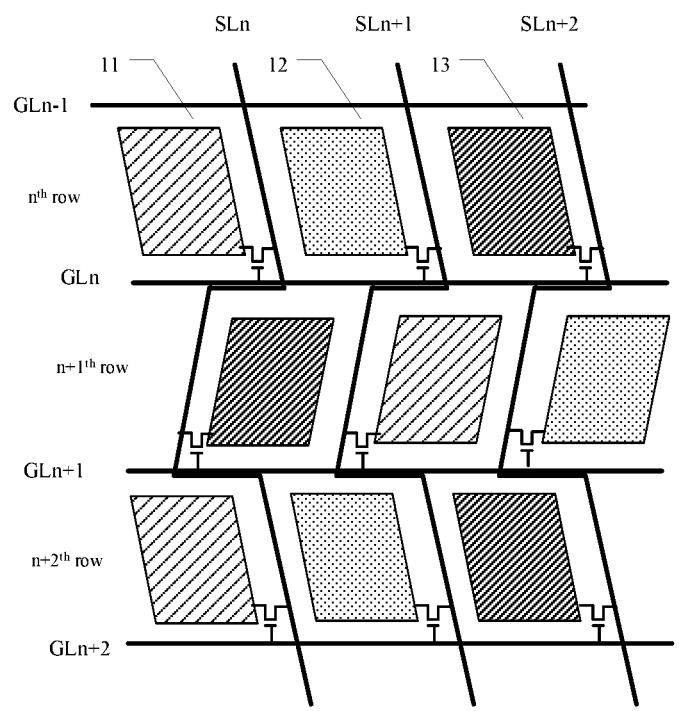
FIG. 4 is a diagram of another array substrate provided in an implementation of the present invention.

Furthermore, the array substrate may be an array substrate of Z-reverting type and a same data line may also be connected with subpixel units of the same color as shown in FIG. 3, or connected with subpixel units of two colors as shown in FIG. 4. Preferably, in order to reduce the power consumption of the array substrate upon displaying pure color pictures, the same data line is connected with subpixel units of one color.

Figure 5:
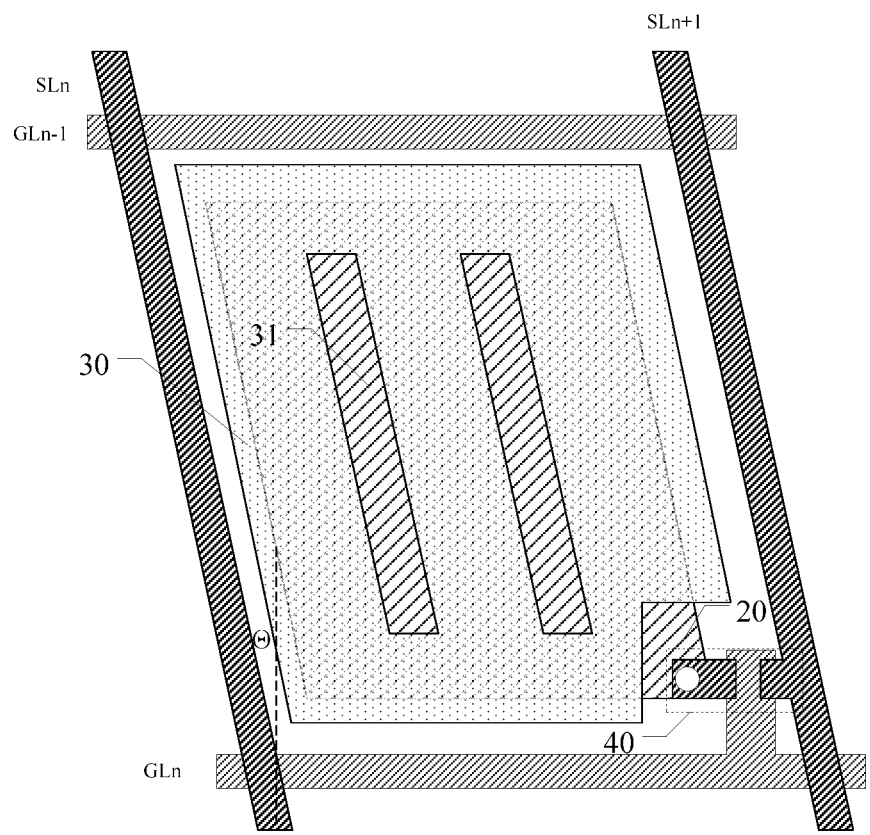
FIG. 5 is a diagram of a subpixel unit in the array substrate shown in FIG. 3.

Each subpixel unit is provided with a thin film transistor and a first electrode and a second electrode for forming electric field, wherein the thin film transistor may be located at any vertex of the subpixel unit. With respect to the subpixel unit at the top left corner of FIG. 3, referring to FIG. 5, the two gate lines GLn−1 and GLn that form the subpixel unit are disposed horizontally, parts of the two data lines SLn and SLn+1 that are between the two gate lines GLn−1 and GLn are inclined to the left with respect to the vertical direction (as shown with the dashed line in FIG. 5) with an incline angle of 1~45 degree. The thin film transistor 40 is located at the bottom right vertex of the subpixel unit. The first electrode 20 is of a parallelogram shape and has its sides disposed parallel to corresponding sides of the subpixel unit where it is located such that the first electrode has an incline direction consistent with that of the subpixel unit. A slit (or slits) 31 of a parallelogram shape is provided in the second electrode 30, the slit 31 having sides disposed parallel to corresponding sides of the subpixel unit such that the slit has an incline direction consistent with that of the subpixel unit.

With the array substrate provided in implementations of the present invention, a display mode of two-pixels-two-domains pixel structure may be implemented by designing subpixel units in the array substrate as parallelograms and making subpixel units in adjacent two rows to have opposite incline directions. Since subpixel units in the entire array substrate are divided into two parts according to different incline directions, and it is in turn possible to enable liquid crystal in subpixel units of the same color to be classified into two directions under a certain gray scale and thus the liquid crystal on both sides of gate lines can be set symmetrical about the gate lines, and thereby to effectively increase viewing angle and reduce color shift while the array substrate is used for virtual display. Additionally, by arranging three subpixel units adjacent to each other in two adjacent rows as a triangle, dispersion degree of subpixel units is increased and uniform distribution of colors in the virtual space is improved when the array substrate is used for virtual display.

Figure 6:
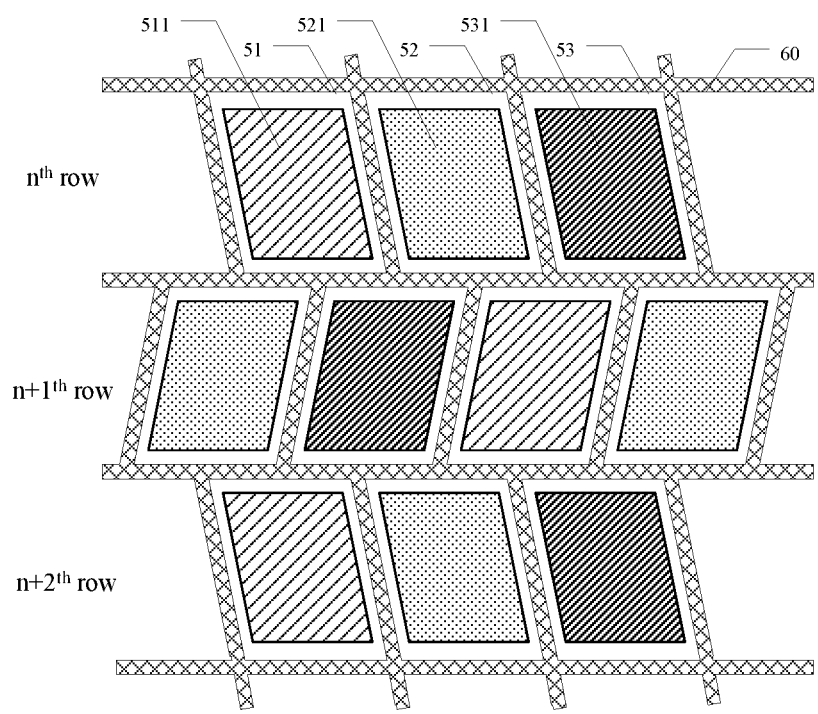
FIG. 6 is a diagram of a color filter substrate provided in an implementation of the present invention.

Furthermore, the above-mentioned display substrate may also be a color filter substrate. Referring to FIG. 6, which is a diagram of a color filter substrate provided in an implementation of the present invention, including a base substrate and a black matrix 60 disposed on the base substrate which defines a number of subpixel units of parallelogram shape, each parallelogram including first sides parallel to the row direction and second sides inclined with respect to the vertical direction. In the same row, the shape and size of subpixel units are identical with each other, and the second sides have the same incline direction with respect to the vertical direction, while for adjacent tow rows, sides of subpixel units in adjacent two rows have opposite incline directions but the same incline angles. Subpixel units in each row are misaligned with subpixel units in its adjacent rows, a color filter for displaying corresponding color is provided in each subpixel unit, wherein the color filter is of a parallelogram shape similar to that of the subpixel unit where it is located.

The subpixel units in the color filter substrate include subpixel units of the first color, subpixel units of the second color and subpixel units of the third color that are arranged periodically in each row and each subpixel unit has different color from that of adjacent subpixel units. For example, for the three subpixel units 51, 52 and 53 in the $n^{th}$ row in FIG. 6, the subpixel units 51 are provided with red color filters 511 such that the subpixel units display red color, subpixel units 52 are provided with green color filters 521 such that the subpixel units display green color, and subpixel units 53 are provided with blue color filters 531 such that the subpixel units display blue color.

With the color filter substrate provided in implementations of the present invention, a display mode of two-pixels-two-domains pixel structure may be implemented by designing subpixel units in the array substrate as parallelogram shapes and setting subpixel units in adjacent two rows to have opposite incline directions, which allows effectively increase viewing angle and reduce color shift while the color filter substrate is used for virtual display. Additionally, by arranging three subpixel units adjacent to each other in two adjacent rows as a triangle, dispersion degree of subpixel units is increased and uniform distribution of colors in the virtual space is improved when the color filter substrate is used for virtual display.

Furthermore, an implementation of the present invention further provides a display device including any one of the above-mentioned display substrates. The display device provided in implementations of the present invention may be any product or component with display function, such as, a notebook computer display screen, a liquid crystal display, a liquid crystal TV set, a digital picture frame, a cell phone or a tablet computer.

The above implementations are only provided for describing the present invention rather than limiting the present invention. Various variations and modifications may be further made by one of ordinary skill in the art without departing from the spirit and scope of the present invention. Therefore, all equivalent technical proposals should belong to the scope of the present invention too and the scope of the present invention should be defined by claims.

The present application claims priority of China Patent application No. 201510065369.5 filed on Feb. 6, 2015, the content of which is incorporated in its entirety as part of the present application by reference herein.

The invention claimed is:

1. A display substrate, comprising a base substrate and multiple rows of subpixel units formed on the base substrate, each of the subpixel units being of a parallelogram shape comprising two first sides parallel to a row direction and two second sides inclined with respect to a vertical direction, wherein the vertical direction is perpendicular to the row direction, second sides of all subpixel units in a same row have a same incline direction, and second sides of subpixel units in adjacent two rows have opposite incline directions from each other;
   wherein subpixel units in any row are misaligned with subpixel units in a row adjacent to the any row;
   wherein, for any subpixel unit, a distance from its geometric center to a geometric center of each adjacent misaligned subpixel unit in the vertical direction is identical;
   wherein the multiple rows of subpixel units include at least a first row of subpixel units, a second row of subpixel units and a third row of subpixel units; and
   wherein for a first subpixel unit that is in the second row of subpixel units and has four adjacent misaligned subpixel units in the vertical direction, four distances from a geometric center of the first subpixel unit to geometric centers of the four adjacent misaligned subpixel units in the vertical direction are identical.

2. The display substrate of claim 1, wherein the second sides of subpixel units in adjacent two rows have identical absolute values of incline angles and opposite incline directions with respect to the vertical direction.

3. The display substrate of claim 2, wherein, for each subpixel unit, a ratio of its height in the vertical direction to a length of its first side in the row direction is 3:3~3:1.

4. A display device, wherein the display device comprises the display substrate of claim 3.

5. The display substrate of claim 2, wherein, for each subpixel unit, an incline angle of the second side with respect to the vertical direction is 1~45 degree.

6. A display device, wherein the display device comprises the display substrate of claim 5.

7. A display device, wherein the display device comprises the display substrate of claim 2.

8. The display substrate of claim 1, wherein gate lines and data lines intersecting with each other are disposed on the base substrate, the gate lines is used for forming first sides of the parallelograms, the data lines is used for forming second sides of the parallelograms, a thin film transistor and a first electrode and a second electrode are provided in each subpixel unit, the first electrode and the second electrode forming a electric field, each subpixel unit is used for displaying one color, and one data line is connected with subpixel units for displaying one or two colors.

9. The display substrate of claim 8, wherein the first electrodes are of parallelogram shape, sides of the first electrodes are disposed parallel to corresponding sides of subpixel units where they are located in, slits of parallelogram shape are provided in the second electrodes, with sides of the slits being disposed parallel to corresponding sides of subpixel units where they are located in.

10. A display device, wherein the display device comprises the display substrate of claim 9.

11. A display device, wherein the display device comprises the display substrate of claim 8.

12. The display substrate of claim 1, wherein a black matrix is provided on the base substrate to form first sides and second sides of the subpixel units, and each subpixel unit is provided with a color filter for displaying corresponding color.

13. The display substrate of claim 12, wherein the subpixel units comprise subpixel units displaying a first color, subpixel units displaying a second color and subpixel units displaying a third color that are arranged periodically in each row, and each subpixel unit displays different color from its adjacent subpixel units.

14. A display device, wherein the display device comprises the display substrate of claim 13.

15. A display device, wherein the display device comprises the display substrate of claim 12.

16. A display device, wherein the display device comprises the display substrate of claim 1.

* * * * *